(12) United States Patent
Nagaraja

(10) Patent No.: US 7,433,435 B2
(45) Date of Patent: Oct. 7, 2008

(54) APPARATUS, METHODS, SYSTEMS, AND ARTICLES INCORPORATING A CLOCK CORRECTION TECHNIQUE

(75) Inventor: Srikanth Nagaraja, Bangalore (IN)

(73) Assignee: Sasken Communication Technologies Limited, Bangalore (IN)

( * ) Notice: Subject to any disclaimer, the term of this patent is extended or adjusted under 35 U.S.C. 154(b) by 803 days.

(21) Appl. No.: 10/692,040

(22) Filed: Oct. 22, 2003

(65) Prior Publication Data

US 2005/0089127 A1    Apr. 28, 2005

(51) Int. Cl.
    *H04L 7/00*     (2006.01)
(52) U.S. Cl. ........................ 375/354; 375/356
(58) Field of Classification Search ................ 375/222, 375/260, 326, 350, 354, 358, 373, 376, 356, 375/229; 370/203
See application file for complete search history.

(56) References Cited

U.S. PATENT DOCUMENTS 5,228,062 A      7/1993  Bingham et al.
5,694,388 A  * 12/1997  Sawahashi et al. .......... 370/206
6,198,782 B1 *  3/2001  De Courville et al. ....... 375/341
6,370,188 B1 *  4/2002  Wu et al. ..................... 375/222
6,487,252 B1 * 11/2002  Kleider et al. ............... 375/260
6,577,690 B1 *  6/2003  Barman et al. ............... 375/354
6,701,133 B1 *  3/2004  Bennett et al. ................. 455/71
6,804,318 B1 * 10/2004  Alloin et al. ................. 375/373
6,985,432 B1 *  1/2006  Hadad .......................... 370/203
7,027,464 B1 *  4/2006  Nakahara et al. ............ 370/503
7,035,326 B1 *  4/2006  Heidari et al. ............... 375/229
7,058,002 B1 *  6/2006  Kumagai et al. ............ 370/203
7,130,368 B1 * 10/2006  Aweya et al. ................ 375/376
2002/0186802 A1 * 12/2002  Morgan et al. .............. 375/355
2003/0142764 A1 *  7/2003  Keevill et al. ............... 375/341
2004/0156441 A1 *  8/2004  Peeters et al. ............... 375/260
2006/0045174 A1 *  3/2006  Phogat et al. ............... 375/222
2006/0104195 A1 *  5/2006  Nakahara et al. ............ 370/203

* cited by examiner

*Primary Examiner*—Mohammad Ghayour
*Assistant Examiner*—Lawrence B Williams
(74) *Attorney, Agent, or Firm*—Schwegman, Lundberg & Woessner, P.A.

(57) ABSTRACT

The present invention provides an improved clock correction scheme for multi-carrier transmission systems, based on synchronizing a local receiver with a remote transmitter using estimated phase and frequency drifts between the remote transmitter and local receiver clocks. Also, described are communication devices and methods.

29 Claims, 6 Drawing Sheets

APPARATUS, METHODS, SYSTEMS, AND ARTICLES INCORPORATING A CLOCK CORRECTION TECHNIQUE

RELATED INVENTION

The present invention is related to U.S. Pat. No. 6,577,690, entitled "Clock recovery in multi-carrier transmission systems", which is assigned to the assignee of the present invention and incorporated herein by reference.

FIELD OF THE INVENTION

This invention generally relates to data communication systems and more particularly to clock correction techniques for multi-carrier communication systems.

BACKGROUND

A data communication system that employs Frequency Division Multiplexed (FDM) sub carriers for transmission of data across a communication channel is termed a multi-carrier communication system. A data communication system generally has a remote transceiver, such as a central office (CO) side modem and a local transceiver, such as a customer premise (CP) side modem. A transceiver generally has both the transmitter and the receiver.

In a data communication system, the remote and local transceivers have independent sampling clocks running their digital-to-analog converter (DAC) and analog-to-digital converter (ADC) clocks. The remote transceiver, in addition to having a DAC, also has an ADC to receive analog waveforms transmitted by the local transceiver. Similarly, the local transceiver, in addition to having an ADC, also has a DAC to transmit analog waveforms to the remote transceiver. The same clock signal drives both the DAC and ADC clocks of a given transceiver, and thus the DAC and ADC clocks of any given transceiver have a fixed phase relationship with each other. Changing the ADC clock phase by a certain amount on the local transceiver side also changes the clock phase by the same amount on the corresponding DAC on the local transceiver side. The same is true for the DAC and ADC clocks in the remote transceiver side.

The problem with such a data communication system is that it is generally difficult to provide synchronization between the ADC and DAC clocks running on the local transceiver side and the ADC and DAC clocks running on the remote transceiver side. As mentioned above, correcting the clock on only one side, for example, on the local transceiver side, automatically provides synchronism between the clock on the remote transceiver side and the clock on the local transceiver side. Therefore, clock correction can be applied to either the remote transceiver or the local transceiver alone. Such a system of clock correction is generally referred to as "loop timing". The problem of loop timing, i.e. synchronization, is complicated by the presence of noise in the channel of a data communication system. Additional impairments like drift in the clock frequencies at either transceiver side or clock jitter, can further compound the clock synchronization problem.

The problem of clock synchronization in data communication systems generally stems from a mismatch between remote transceiver and local transceiver clock frequencies. Loss of clock synchronization typically leads to a loss of frame boundary synchronization, sample slippage, and a higher noise around received signals. These can in turn lead to higher rates of bit errors and a decreased data throughput.

Current solutions to the problem of clock synchronization are based on estimating relevant clock parameters of the system, such as clock drift rate and jitter statistics, and correcting for the same. Corrections for clock mismatch are typically through the manipulation of the clock frequency of the local clock. Many of the current solutions for clock synchronization effect through the use of Phase Lock Loop (PLL) hardware. One such method is disclosed in the U.S. Pat. No. 6,577,690, entitled "Clock recovery in multi-carrier transmission systems". The scheme uses a frequency offset estimator. (Frequency offset here is referred to a "rate of drift of phase". The estimator used to estimate the frequency offset is herewith also referred to by one or more of the following terms "frequency drift estimator" or "frequency estimator". These terms should be taken to mean the one and same thing that is the "frequency offset estimator". The terms "phase drift estimator" and "phase estimator" are used interchangeably and both refer to the same thing), whose output is used to correct the frequency of the local sampling clock. The scheme accounts for only frequency differences between the remote and local transceiver clocks, whereas in practice it is observed that frequency drift also results in a phase drift with respect to the remote transceiver clock. This phase drift is of a magnitude and rate that, if uncorrected, could lead to sample slippage and thus loss of synchronism and consequently suboptimal performance of the modem. For example, U.S. Pat. No. 5,228,062 to John A. C. Bingham discloses a method and apparatus for correcting for clock and carrier frequency offset and phase jitter in multi-carrier modems which involves directly estimating various clock parameters, such as frequency offset, phase jitter and jitter frequency, and so on. The approach disclosed in this patent serves to correct for the effects of phase jitter, jitter frequency, and other clock parameters by fitting a model to these impairments.

Current solutions to the synchronization problem for data communication systems are generally based on correcting frequency differences between the remote and local transceiver clocks. However, in practice it is observed that due to a drift in frequency in the remote and local transceivers, there is also a drift in phase between the remote and local transceiver clocks. This phase drift is of such a magnitude and rate that if left uncorrected, could lead to sample slippage and thus lead to a loss of synchronization between the remote and local transceiver clocks, and consequently result in sub-optimal performance of the modems.

Therefore, there is a need to synchronize the remote and local transceiver clocks by correcting for both the frequency and phase drifts between the remote and local transceiver clocks, to improve performance of the modems in a data communication system.

SUMMARY OF THE INVENTION

A clock correction technique for communication systems uses estimates of frequency and phase drifts between a local receiver clock and a remote transceiver clock using a pilot signal received by a local receiver. The local transceiver clock is then adjusted using the estimated frequency and phase drifts to synchronize the local transceiver clock with the remote transceiver clock.

The clock correction technique synchronizes both the frequency and phase of the local transceiver clock with those of the remote transceiver clock. This is achieved by having independent estimators for frequency offset and phase drift. Each of these estimates is then combined to form a single correction factor to the local transceiver clock and the resultant samples are again examined for any drifts in frequency or phase. Thus, a continuous feedback loop exists between the estimates and the corrections applied to the local sampling clock. This feedback process, without the need for complicated and computationally intensive fits to clock models, can handle just about any clock jitter or unmodelled effects in a clock.

In one example embodiment, the improved clock correction technique is used in a multi-carrier system. This is accomplished by using a received pilot signal of a predetermined frequency, amplitude, and signal phase. A predetermined number of Discrete Fourier Transform (DFT) points based on digital samples are then outputted on a per-frame basis using the input pilot signal. Frequency and phase drifts between the local receiver and remote transmitter clocks are then estimated using the predetermined number of DFT points. A clock correction parameter is then computed based on the frequency and phase drift estimates. The local receiver clock is then adjusted to synchronize the local receiver clock with the remote transmitter clock based on the computed clock correction parameter. The above steps are then repeated for a next predetermined number of DFT points to continue synchronizing the local receiver clock with the remote transmitter clock.

Other aspects of the invention will be apparent on reading the following detailed description of the invention and viewing the drawings that form a part thereof.

DETAILED DESCRIPTION

The present invention provides an improved clock correction technique for multi-carrier communication systems. In one embodiment, this is accomplished by estimating frequency and phase drifts between a local receiver clock and a remote transmitter clock using a pilot signal received by a local receiver. The local receiver clock is then adjusted using the estimated frequency and phase drifts to synchronize the local receiver clock with the remote transmitter clock to improve performance.

In the following detailed description of the embodiments of the invention, reference is made to the accompanying drawings that form a part hereof, and in which are shown by way of illustration specific embodiments in which the invention may be practiced. These embodiments are described in sufficient detail to enable those skilled in the art to practice the invention, and it is to be understood that other embodiments may be utilized and that changes may be made without departing from the scope of the present invention. The following detailed description is, therefore not to be taken in a limiting sense, and the scope of the present invention is defined only by the appended claims.

The terms receiver, local receiver, and local transceiver are used interchangeably throughout the document. Similarly, the terms transmitter, remote transmitter, and remote transceiver are also used interchangeably throughout the document. The variables fs_txdac and fs_rxadc refer to remote and local clock frequencies, respectively.

Figure 1:
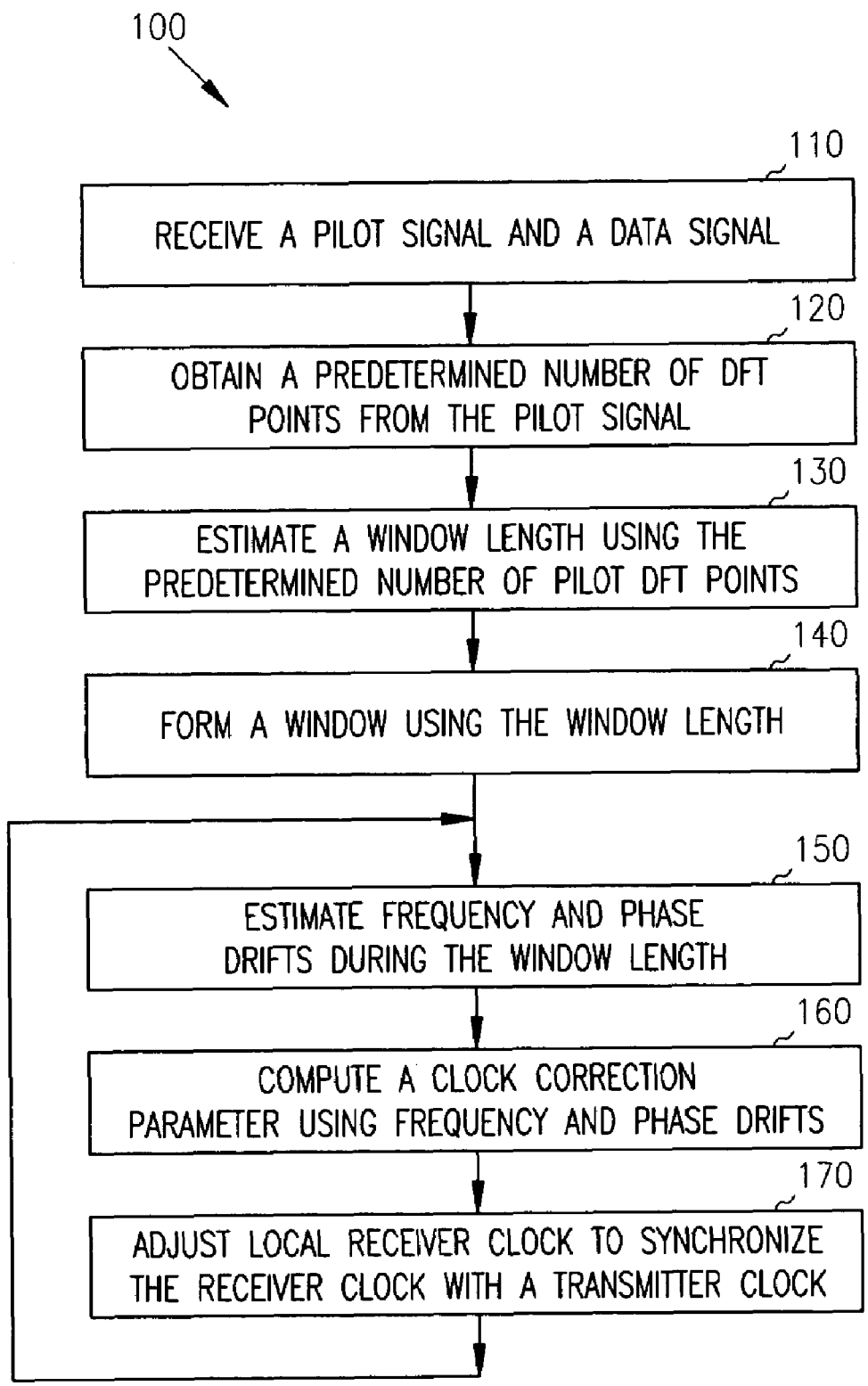
FIG. 1 is a flowchart illustrating an example embodiment of the operation of a clock correction scheme according to the present invention.

Referring now to FIG. 1, there is illustrated one example embodiment of a method 100 of clock correction scheme according to the present invention. This example embodiment assumes application of the clock correction scheme of the present invention to a multi-carrier communication system, although the clock correction scheme can be applied to any communication system requiring a clock correction between a local transceiver and a remote transceiver. In this example embodiment, the method 100 includes steps 110-170, which are arranged serially in the exemplary embodiment. However, other embodiments of the invention may execute two or more steps in parallel, using multiple processors or a single processor organized as two or more virtual machines or subprocessors. Moreover, still other embodiments implement the steps as two or more specific interconnected hardware modules with related control and data signals communicated between and through the modules, or as portions of an application-specific integrated circuit. Thus, the exemplary process flow is applicable to software, firmware, and hardware implementations.

At 110, a pilot signal along with a data signal is received by a local receiver clock from a remote transmitter. In some embodiments, the local receiver and the remote transmitter can be a local transceiver and a remote transceiver. A transceiver generally includes both the receiver and the transmitter. In such a scenario, the remote transmitter and the local receiver have independent clocks running their Digital-to-Analog (DAC) and Analog-to-Digital (ADC) clocks. It is assumed that the same clock drives the DAC and ADC clocks at a given transceiver, and thus the DAC and ADC clocks at a given transceiver have a fixed relationship between them. Therefore, changing the clock on the local receiver side can also change the DAC clock on the local transmitter side by the same amount and vice versa.

The pilot signal can be of a predetermined frequency, amplitude, and signal phase. In some embodiments, the pilot signal is generated using a look-up table, which includes digital samples of the pilot tone, which are then fed to a DAC at a DAC sampling clock rate. References to a "pilot signal" throughout this document should be read as a signal which consists of both a data-carrying signal as well as a predetermined pilot signal. The output of the DAC is then passed through a channel, and at the local receiver side the ADC samples the pilot tone at a predetermined sampling frequency. The sampling frequencies of both the DAC and ADC have the same nominal value.

At 120, a predetermined number of DFT points are obtained from the received pilot signal. In some embodiments, the ADC forms digital samples of the received pilot signal. This process generally requires a time base, which is provided by the ADC clock. Digital samples are then converted to DFT points on a per-frame basis. A pilot DFT point is then selected from the DFT points based on frequency of the pilot signal.

In some embodiments, the pilot DFT point is computed as follows:

$$P(n) = \sum_{i=0}^{L-1} p(i, n) * e^{-j*2*pi*pilot\_bin*i/L}$$

wherein e is the base of the natural logarithm; j is sqrt(−1); pilot_bin is the index in a DFT frame that corresponds to the pilot frequency; L is the number of samples per DFT frame; i runs from 0 to L-1; p(i,n) denotes the i-th sample of the DFT frame of the pilot tone (i.e., time domain samples of the pilot tone); "DFT frame" denotes the set of time domain samples per one DFT operation; and P(n) denotes the n-th DFT point of the received pilot tone (i.e., n-th pilot DFT point).

At 130, a window length is estimated using the pilot signal. In some embodiments, the window length is estimated using a signal-to-noise ratio of the input pilot signal. In addition, frequency and phase drift estimations, and synchronization of the local receiver clock with the remote transmitter clock are done during the initial stage and steady state operations. The estimation of the frequency and phase drifts and adjustment of the local receiver clock are explained in more detail later with reference to process steps 140-170. In some embodiments, the window length is estimated using the obtained predetermined number of pilot DFT points. In some embodiments, the window length is also estimated using an experimental and/or prior knowledge base. In these embodiments, the window length estimation is omitted, because the window length is obtained from the experimental and/or the prior knowledge base.

At 140, after computing the window length, a window including a window length of successive pilot DFT points is formed during the initial stage of the operation. At 150, a frequency drift is estimated between the local receiver clock and the remote transmitter clock during the first window. The first window refers to a starting window in the clock correction process. In some embodiments, the frequency drift is estimated by computing a rate of drift of phase between successive pilot DFT points within the first window. In these embodiments, the rate of drift is computed by using angular differences between the successive pilot DFT points over the first window.

Further, the frequency drift f_est is estimated by computing a weighted average of the computed rate of drifts, as for example stated in U.S. Pat. No. 6,577,690, entitled "Clock recovery in multi-carrier transmission systems". In these embodiments, f_est is computed over a window length of $M_{est}$ pilot DFT points. f_est is a measure of del_fs, which is sought to be made zero by correcting the local clock frequency, fs_rxadc, and wherein del_fs=fs_txdac−fs_rxadc.

At 150, a phase drift is also estimated along with the above-described frequency drift. The estimated phase drift is between the local receiver clock and the remote transmitter clock. In some embodiments, the phase drift is estimated by first computing a reference phase. An estimate of the received signal phase is then obtained. The phase drift is then obtained by using the estimate of the received signal phase and the reference phase.

In some embodiments, phase drift is estimated as follows:

Even when del_fs is sought to be made zero, small variations in fs_txdac and fs_rxadc can lead to accumulation of phase errors in the pilot signal at the local receiver. These phase errors can build up over time and can result in poor system performance, by causing sample slippage, for instance. To avoid this inherent problem of a purely frequency correcting scheme of clock correction, a phase drift correction scheme is used, which operates in addition to frequency correction.

$$\text{Set\_Symbol} = 1/M_{est} * \left( \sum_{n=1}^{Mest} (P(n)) \right),$$

wherein $M_{est}$ is the window length; P(n) is a complex number, the averaging indicated above is carried out over both the real and imaginary parts; and Set_Symbol is computed once at the time of start-up, for example, over the second window of $M_{est}$ pilot DFT points.

Then, over subsequent windows of $M_{est}$ pilot DFT points, the Mid_symbol and phase drift estimate are calculated using the following equation:

$$\text{Mid\_Symbol} = 1/M_{est} * \left( \sum_{n=1}^{Mest} P(n) \right),$$

wherein $M_{est}$ is the length of the estimation window; and P(n), n=1,2, ... $M_{est}$ are the pilot DFT points obtained over the present estimation window.

The drift in phase of pilot DFT points with respect to the reference Set_symbol is estimated. This is computed by taking the angle difference between the Mid_symbol and Set_symbol. The angle difference is then extrapolated to the end of the estimation window, knowing the rate of drift of phase (f_est), and the length of the estimation window ($M_{est}$).

p_est=angle(Mid_Symbol*conj(Set_Symbol))+ f_est*$M_{est}$/2

Wherein, p_est is the extrapolated phase drift estimate. At 160, a clock correction parameter is computed using the estimated frequency and phase drifts. At 170, the local receiver clock is adjusted to synchronize the local receiver clock with the remote transmitter clock based on the clock correction parameter. In some embodiments, the local receiver clock is first adjusted based on the estimated frequency drift and then adjusted based on the phase drift, to synchronize the local receiver clock with the remote transmitter clock. In other embodiments, the local receiver clock is first corrected based on the frequency drift during an initial stage of operation, and then the local receiver clock is further corrected based on the clock correction parameter, in a steady state operation, to continually synchronize the local receiver clock with the remote transmitter. Steps 150-170 are repeated during a steady state operation to continuously synchronize the local receiver clock with the remote transmitter clock based on the estimated frequency and phase drifts when the communication system is in operation.

In one embodiment, once f_est and p_est have been computed, they are combined to form the correction parameter to be passed on to the clock correction circuit. In other embodiments, clock correction parameter is computed as follows:

Phase correction, phase_correction_least_count, on the pilot signal results from manipulating the ADC sampling edge by the smallest possible sampling edge correction. This number may be dictated, for instance, by the hardware limitations of the clock correction circuitry.

The net phase drift per DFT frame is obtained by combining the two estimates, the frequency drift and phase drift estimate, as follows, to yield a single clock correction parameter per_symbol_phase_drift:

per_symbol_phase_drift_correction=$f\_est+p\_est/Mest$

The per_symbol_phase drift_correction is computed once every $M_{est}$ pilot DFT points, where $M_{est}$ is the length of the estimation window. The clock correction module operates a running counter, called per_symbol_phase_drift, which is updated with the latest value of per_symbol_phase_drift_correction once every $M_{est}$ pilot DFT points.

Figure 6:
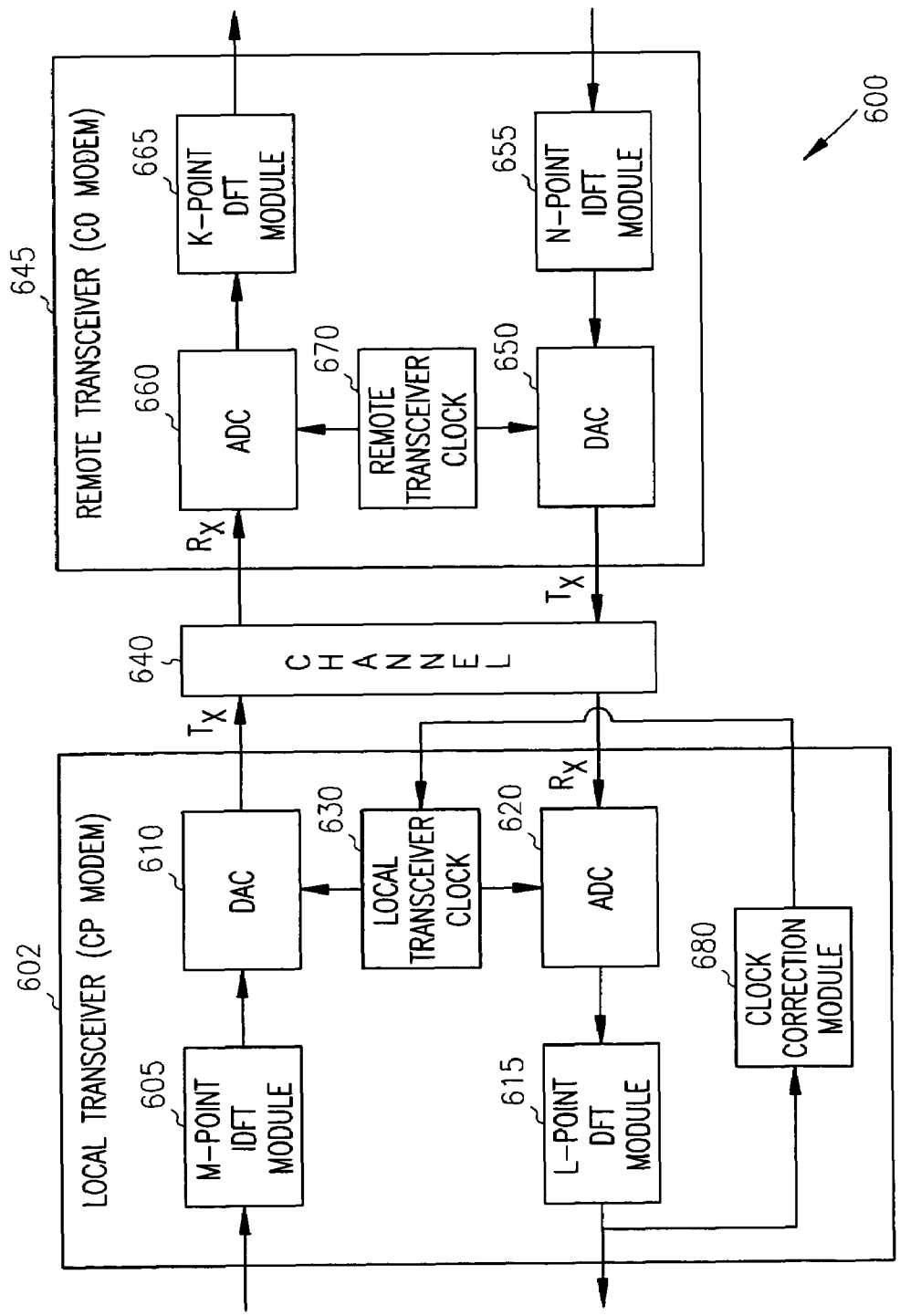
FIG. 6 is a block diagram illustrating major modules of an example embodiment of local and remote transceivers' analog front end architecture in a multi-carrier communication system according to the present invention.
Figure 7:
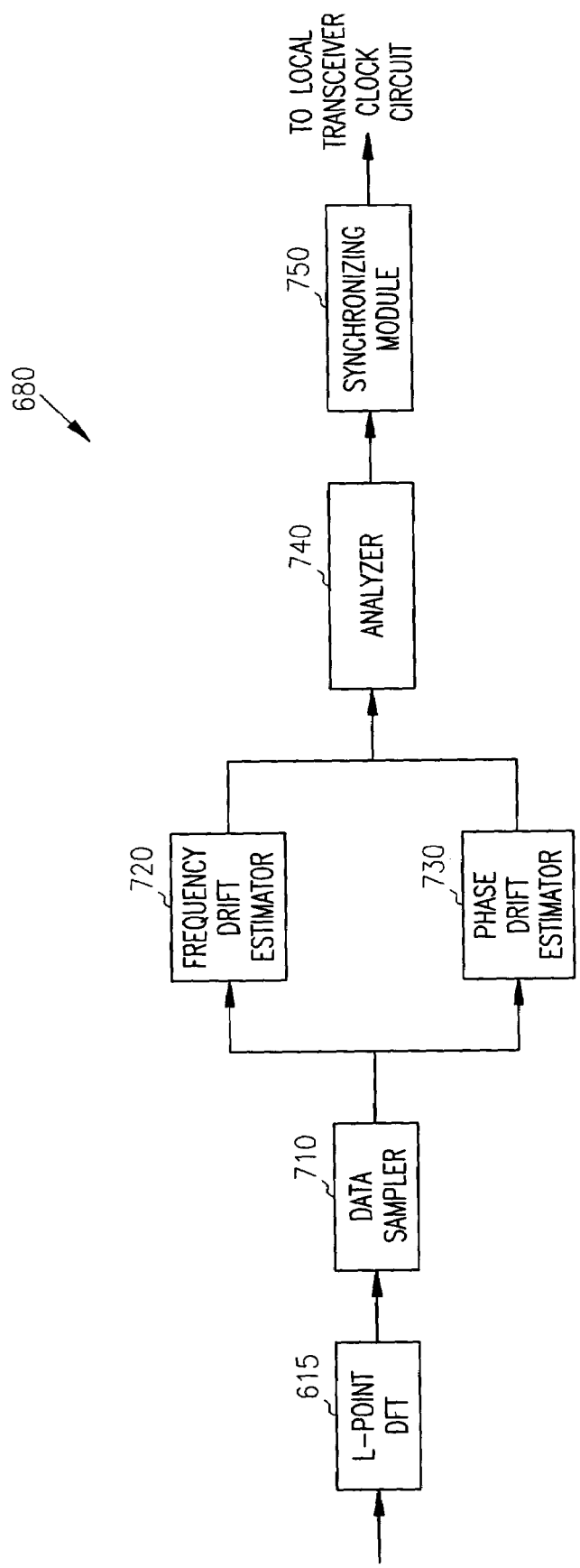
FIG. 7 is a block diagram illustrating major modules of an example clock correction module according to the present invention.

The clock correction module 680, shown in FIGS. 6 and 7, operates a running counter, per_symbol_phase_drift, which is updated with the latest value of per_symbol_phase_drift_correction once every window length.

Note that the method of computing the clock correction parameter could be extended to suit any other implementation of clock correction, and the description given above serves only as an illustration for one embodiment of correction.

In some embodiments, the running counter operates as follows:

---

STEP 0: START-UP per_symbol_phase_drift = 0;
per_sample_phase_drift = 0;
drift_frame_count = 0;
accumulated_drift = 0;
GOTO STEP 1;

STEP 1: WAIT FOR NEW SAMPLE

Do nothing until all new samples are received.
If the new samples are received, GOTO STEP 2.

STEP 2. CORRECTION CALCULATION

Fill receive buffer with the latest received sample.
if (new DFT frame received, i.e. L new samples have been filled in
    the receive buffer)
        Calculate L-point DFT of received frame.
        Hold the Pilot DFT point in buffer.
        if (dft_frame_count == $M_{est}$)
            Recalculate per_symbol_phase_drift_correction using
            the buffered
            ($M_{est}$ in number) pilot DFT points (f_est and p_est are
            calculated here, and combined to form a new estimate-
            per_symbol_phase_drift_correction;
            per_symbol_phase_drift = per_symbol_phase_drift +
                    per_symbol_phase_drift_correction;
            per_sample_phase_drift = per_symbol_phase_drift / L;
                    /* L samples per DFT frame */
            accumulated_drift = 0; /* Erase history */
            dft_frame_count = 0;
        else
            dft_frame_count = dft_frame_count + 1;
        end
end
GOTO STEP 3;

STEP 3: SEND OUT CLOCK CORRECTION VALUE

For every new sample received do the following:
    1.  accumulated_drift = accumulated_drift +
            per_sample_phase_drift;
    2.  clock_correction_delta = −1 * round(accumulated_drift /
            phase_correction_least_count);
    3.  Send clock_correction_delta value to clock correction unit.
    4.  accumulated_drift = accumulated_drift +
            clock_correction_delta *
phase_correction_least_count;
    GOTO STEP 1;

---

Figure 2:
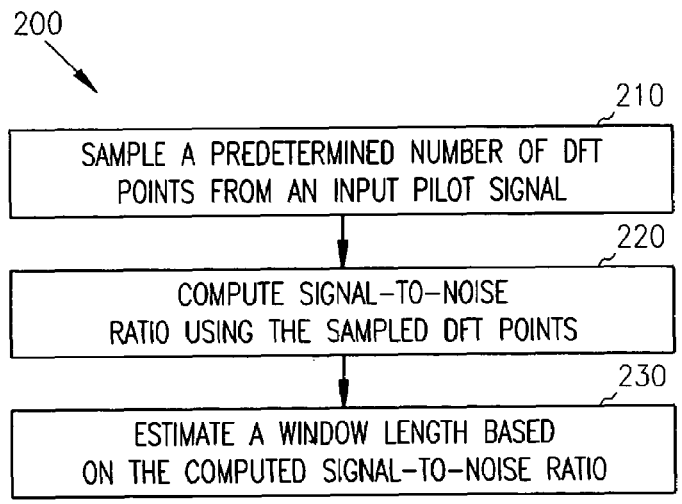
FIG. 2 is a flowchart illustrating an example embodiment of the operation of estimating a window length according to the present invention.

Referring now to FIG. 2, there is illustrated another example embodiment 200 of a method of estimating a window length according to the present invention. At 210, method 200 provides for sampling a predetermined number of DFT points from an input pilot signal. At 220, signal-to-noise ratio is computed using the obtained pilot DFT points. At 230, a window length is estimated based on the computed signal-to-noise ratio. The estimation of the window length is described in detail above with reference to block 120 shown in FIG. 1. Further, the estimation of the window length is described in more detail in U.S. Pat. No. 6,577,690, entitled "Clock recovery in multi-carrier transmission systems".

Figure 3:
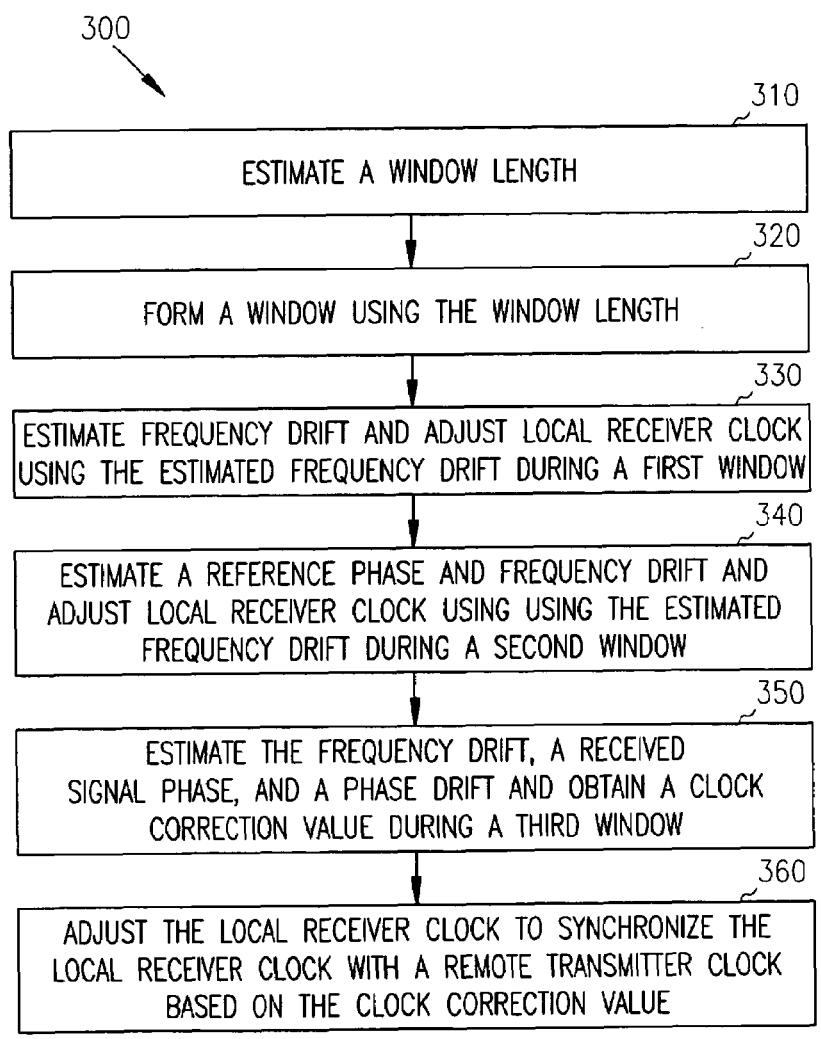
FIG. 3 is a flowchart illustrating an example embodiment of various windows based operations involved in the clock correction process implemented according to the present invention.

Referring now to FIG. 3, there is illustrated another example embodiment 300 of a method of the clock correction process according to the present invention. At 310, this example embodiment provides for estimating a window length, which in turn is used to estimate frequency and phase drifts. At 320, a window is formed using the estimated window length during an initial stage of the operation.

Figure 4:
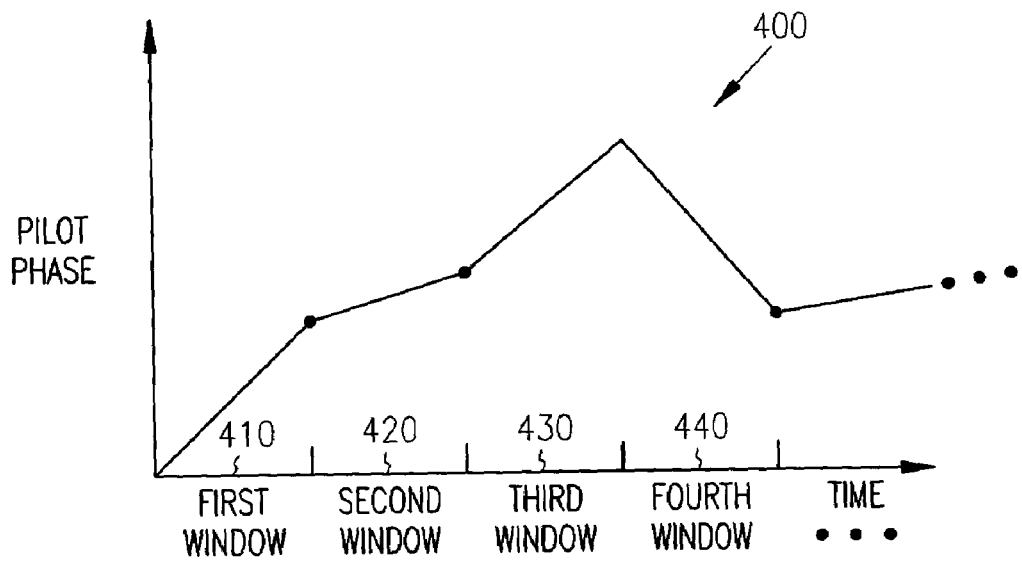
FIG. 4 is a graph illustrating an example embodiment of variations in phase of a pilot signal over time during the clock correction process shown in FIG. 3.

At 330, the frequency drift between the local receiver clock and the remote transmitter clock is estimated during the first window, such as window 410 shown in FIG. 4. Further, at 330, the local receiver clock is adjusted based on the estimated frequency drift.

At 340, the local receiver clock is adjusted to correct for frequency drift based on the estimated drift during the first window. As shown in FIG. 4, the slope of the line in the second window 420 is significantly reduced when compared with the slope of the line in the first window 410, due to the application of the frequency drift correction in the first window 410. After the application of the frequency drift correction in the first window 410, the slope of the line in the second window 420 becomes closer to an ideal condition.

Figure 5:
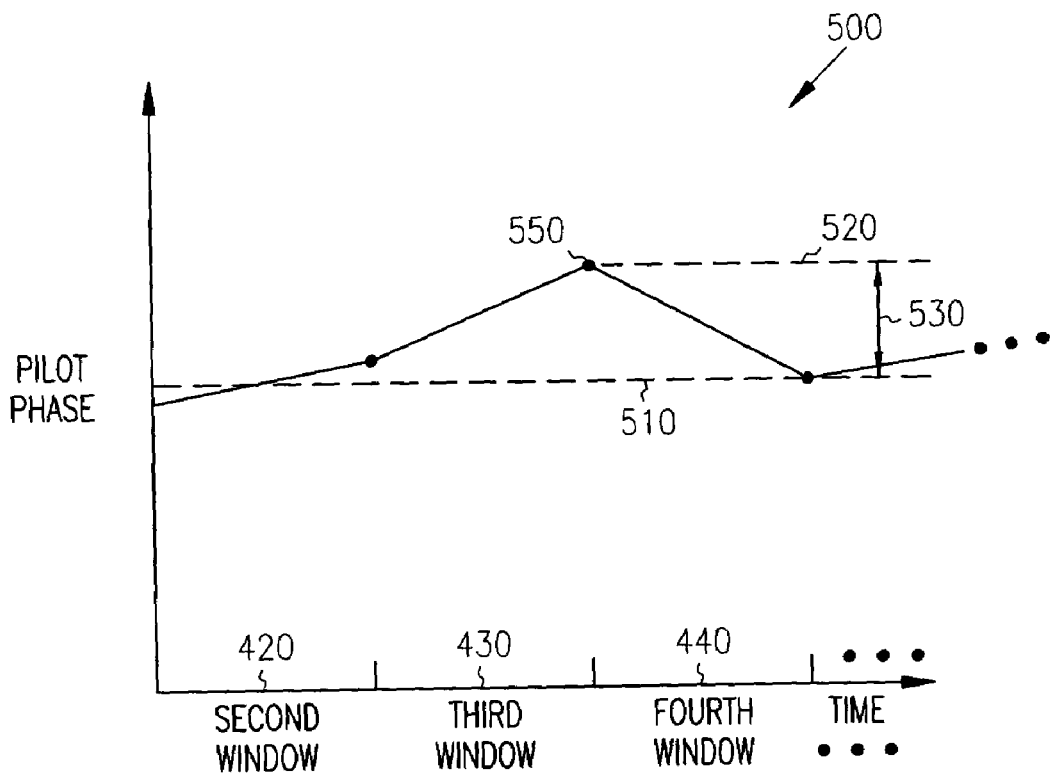
FIG. 5 is a graph illustrating an example of phase drift estimation according to the present invention.

Further, at 340 a reference phase is estimated, such as reference phase 510, shown in FIG. 5, during a second window 420, also shown in FIG. 5. In the example embodiment shown in FIG. 5, the reference phase 510 is computed by finding the Set_symbol over the second window 420, and computing the phase corresponding to it 510. In some embodiments, the reference phase 510 could be obtained from prior knowledge. In such a case the reference phase estimation could be omitted during the second window. In addition, at 340 the frequency drift is estimated and the local receiver clock is adjusted based on the estimated frequency drift.

At 350, the frequency drift is estimated. In addition, at 350, a received signal phase 520 is estimated, as shown in FIG. 5, during a third window 430. In the example embodiment, shown in FIG. 5, the received signal phase 520 is estimated by finding the end point 550 in the third window 430. At 350, a phase drift 530 between the received signal phase and the reference phase is computed, as shown in FIG. 5, during the third window as shown in FIG. 4.

Further, at 350, the estimated frequency drift and the estimated phase drift 530 are combined to form the clock correction value. At 360, the local receiver clock is adjusted based on the clock correction value to synchronize the local receiver clock with the remote transmitter clock. In these embodiments, 350 and 360, taken together, depict a steady state operation including estimating frequency and phase drifts and correction the local receiver clock based on the estimated frequency and phase drifts.

In another embodiment, at 360, the estimated received signal phase 520, as shown in FIG. 5, is combined with the estimated frequency drift to estimate the end point 550 in the third window 430. The phase drift 530 between the end point 550 and the reference phase 510 is computed. The computed phase drift 530 is the phase drift estimate. The frequency drift estimate and the phase drift estimate 530 are then combined to yield a single clock correction parameter with which the local receiver clock is then corrected. These steps are repeated for all subsequent windows.

In some embodiments, the frequency and phase drifts can be estimated using data carrying signals. It can also be envisioned that the frequency and phase drift estimations could be modified to suit particular characteristics of a communication system; for example, including multi-tone pilots in a multi-carrier system or combining phase and frequency drift estimates over multiple independent estimation intervals of a weak pilot signal, thus improving the accuracy of the estimates. In some embodiments, the frequency and phase drifts are not combined to obtain a clock correction parameter. Instead, an initial acquisition stage could use frequency drift estimates alone to correct the clock; subsequent to this a tracking stage could involve only the phase drift estimates to maintain the local clock phase fixed with respect to the remote clock phase as shown in FIGS. 4 and 5.

FIG. 4 illustrates a temporal view of the pilot phase (phase of the pilot DFT points) during various stages of operation of the clock correction scheme. It is assumed that the window length estimation, as described above with reference to FIGS. 2 and 3, has been done prior to starting the clock correction operation shown in the first window of FIGS. 4 and 5.

FIGS. 4 and 5 illustrate the following example stages of operation in the clock correction scheme.
1. Frequency offset estimate is computed over the first window, and clock correction using the estimated frequency offset is applied to the local receiver clock.
2. Frequency offset estimate is computed over the second window, and a clock correction is applied again to the local receiver clock. A reference phase is computed by computing a Set_symbol. The Set_symbol is computed by an averaging of the pilot DFT points in the second window.
3. Frequency offset estimate is computed again over the third window and an estimate of received signal phase is computed by computing Mid_symbol over the third window. The Set_symbol, the Mid_symbol, and the estimate of the frequency drift are used to compute the phase drift during the third window. The estimated frequency drift and the phase drift are then combined to obtain a clock correction value. The obtained clock correction value is then applied to the local receiver clock to adjust the local receiver clock at the end of the third window.

The operations described above in step 3 are repeated in subsequent windows and form the steady state operation.

Referring now to FIG. 6, there is illustrated an example embodiment of a multi-carrier communication system 600 according to the present invention. The multi-carrier communication system 600 includes a clock correction module 680 which synchronizes a local transceiver clock 630 with a remote transceiver clock 670 based on a clock correction on only one side of the multi-carrier communication system 600. For example, correcting the local transceiver clock 630 synchronizes the local transceiver clock 670 with the remote transceiver clock and vice versa.

Referring now to FIG. 7, there is illustrated an example embodiment of a clock correction module 680 according to the present invention. The clock correction module 680 includes a L-point DFT module 615, data sampler 710, a frequency drift estimator 720, a phase drift estimator 730, an analyzer 740, and a synchronizing module 750.

At a remote transmitter in a remote transceiver (or CO modem) 645, a frame of frequency-domain symbols is converted to a set of time domain samples by an N-point IDFT module 655. A local transmitter on a local transceiver (or CP modem) 602 in an M-point IDFT module 605 carries out a similar operation for transmission from CP modem 602 to CO modem 645. Digital-to-Analog Converters (DACs) 610 and 650 convert the time domain samples to an analog waveform which is then transmitted over the channel 640. The conversion of time-domain samples to an analog waveform needs a time base, which is provided by a DAC clock. Analog-to-Digital Converters (ADCs) 620 and 660 forms digital samples of the received waveform. This process also requires a time base, which is provided by an ADC clock. These samples are then fed to the L-Point and K- Point DFT modules 615 and 665, respectively, which then output DFT points on a per-frame basis. One DFT frame consists of K time-domain points on the CO modem 645 side and L time-domain points at the CP modem 602 side.

The CP and CO modems 602 and 645 have local transceiver and remote transceiver clocks, 630 and 670. These local transceiver and remote transceiver clocks are fed to the DAC and ADC at the respective ends. The CP modem 602 side has, in addition to having DAC 610, an ADC 620 to receive the analog waveform transmitted by the CO modem 645. Similarly, the CO modem 645 side has a DAC 650 to transmit analog waveform to the CP modem 602. It is assumed that the same clock drives the DAC and ADC clocks at a given modem. Therefore, remote transceiver clock 670 and the local transceiver clock 630 are shown connected to their corresponding DAC and ADC modules.

As shown in FIG. 6, the clock correction module 680 is coupled between an output of the L-Point DFT module 615 and the local transceiver clock 630. The correction module 680 provides synchronization between the local transceiver clock 630 and the remote transceiver clock 670 by adjusting the local transceiver clock 630 according to the teachings of the present invention.

In operation, the data sampler 710 receives a signal containing a pilot signal of a predetermined carrier frequency and signal phase from the L-Point DFT module 615. In some embodiments, L-Point DFT module 615 receives digital time domain samples of a transmitter signal containing the pilot signal from a remote transceiver 645, shown in FIG. 6, and outputs a predetermined number of DFT points. In these embodiments, the data sampler 710 receives the predetermined number of DFT points from the L-Point DFT module 615.

The frequency drift estimator 720 receives the input pilot signal from the data sampler 710 and estimates frequency drift between the local transceiver clock 630 and the remote transceiver clock 670 (shown in FIG. 6). In some embodiments, the frequency drift estimator 720, after receiving the predetermined number of DFT points from the data sampler 710, computes a signal-to-noise ratio using the predetermined number of DFT points.

Further, the frequency drift estimator 720 computes a window length using the computed signal-to-noise ratio and then forms a window using the computed window length. Furthermore, the frequency drift estimator 720 estimates the frequency drift between the local transceiver clock 630 and the remote transceiver clock 670 (shown in FIG. 6) using the formed window and the received input pilot signal. In some embodiments, the frequency drift estimator 720 computes angular differences, a rate of drift in the signal phase, between successive pilot DFT points in a window, and estimates the frequency drift by computing a weighted average of the computed angular differences during a window. In one embodiment, the rate of drift is computed by estimating angular differences between the successive pilot DFT points.

The phase drift estimator receives 730 the frequency drift estimate from the frequency drift estimator 720 along with the input pilot signal and data signal from the data sampler 710, and estimates a phase drift between the local transceiver clock 630 and the remote transceiver clock 670 (shown in FIG. 6). In some embodiments, the phase drift estimator 730 estimates a reference phase during a second window in the initial stage. Further, the phase drift estimator 730 obtains an estimate of the sampled signal phase during the third window in the initial stage. Furthermore, the phase drift estimator 730 obtains the phase drift using the sampled signal phase and the reference phase. This process of estimating the phase drift then continues over subsequent windows. The process of obtaining the phase drift during the initial stage is explained in more detail with reference to FIGS. 3, 4, and 5.

In some embodiments, the frequency drift is applied during the first window to synchronize the local transceiver clock 630 with the remote transceiver clock 670 (shown in FIG. 6). In other embodiments, the phase drift is applied, subsequent to applying the frequency drift, to further synchronize the local transceiver clock 630 with the remote transceiver clock 670.

In some embodiments, the analyzer 740 receives the frequency and phase drift estimates from the frequency drift estimator 720 and the phase drift estimator 730 and computes a clock correction parameter based on the frequency and phase drift estimates. The synchronizing module 750 then receives the clock correction parameter from the analyzer 740 and adjusts the local transceiver clock 630 to synchronize the local transceiver clock 630 with the remote transceiver clock 670 (shown in FIG. 6). In some embodiments, the synchronizing module 750 adjusts the local transceiver ADC and DAC clocks to synchronize the local transceiver ADC and DAC clocks with the remote transceiver ADC and DAC clocks. The process of estimating frequency and phase drifts and using the estimated frequency and phase drifts to correct the local transceiver clock to synchronize the local transceiver clock with the remote transceiver clock during the initial stage and the steady state operation is explained in more detail with reference to FIGS. 1, 2, 3, 4, and 5.

Methods 100, 200, and 300 shown in FIGS. 1, 2, and 3 may be a clock correction module 680 including a data sampler 710, a frequency drift estimator 720, a phase drift estimator 730, an analyzer 740, and a synchronizing module 750, as shown in FIGS. 6 and 7. Various aspects of the present invention are implemented in software, which may be run in the environment shown in FIG. 8 or any other suitable computing environment. The present invention is operable in a number of other general purpose or special purpose computing environments. Some computing environments are personal computers, general-purpose computers, server computers, hand-held devices, laptop devices, multiprocessors, microprocessors, set top boxes, programmable consumer electronics, network PCs, minicomputers, mainframe computers, distributed computing environments, and the like, to execute computer-executable instructions for performing a clock correction according to the present invention, which is stored on a computer readable medium. The present invention may be implemented in part or in whole as computer-executable instructions, such as program modules that are executed by a computer. Generally, program modules include routines, programs, objects, components, data structures, and the like, to perform particular tasks or to implement particular abstract data types. In a distributed computing environment, program modules may be located in local or remote storage devices.

Figure 8:
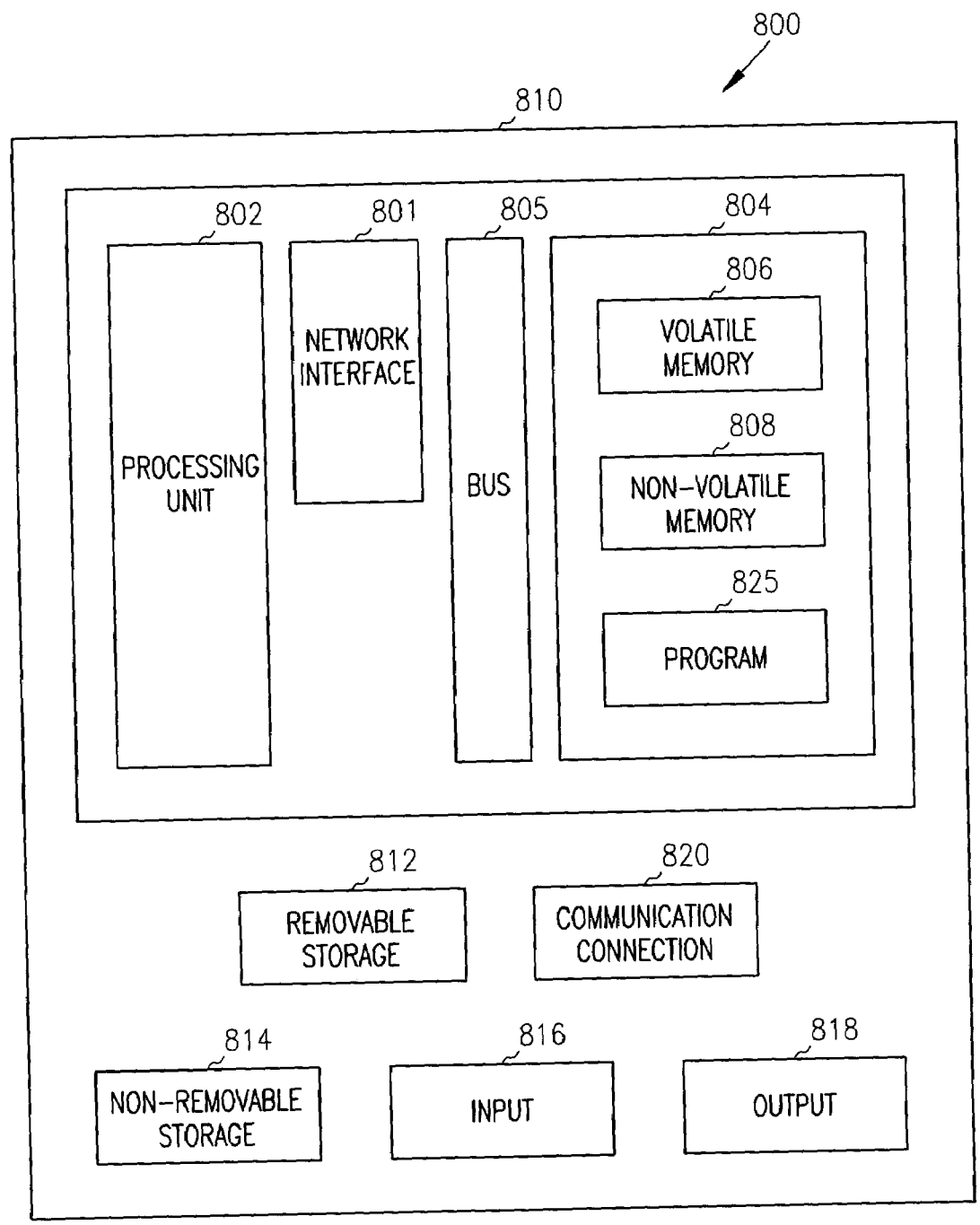
FIG. 8 is a block diagram of a suitable computing system environment for implementing embodiments of the present invention, such as those shown in FIGS. 1, 2, 3, 4, and 5.

FIG. 8 shows an example of a suitable computing system environment 800 for implementing embodiments of the present invention, such as those shown in FIGS. 1-7. Various aspects of the present invention are implemented in software, which may be run in the environment shown in FIG. 8 or any other suitable computing environment. The present invention is operable in a number of other general purpose or special purpose computing environments. Some computing environments are personal computers, server computers, hand-held devices, laptop devices, multiprocessors, microprocessors, set top boxes, programmable consumer electronics, network PCs, minicomputers, mainframe computers, distributed computing environments, and the like. The present invention may be implemented in part or in whole as computer-executable instructions, such as program modules that are executed by a computer. Generally, program modules include routines, programs, objects, components, data structures and the like to perform particular tasks or to implement particular abstract data types. In a distributed computing environment, program modules may be located in local or remote storage devices.

FIG. 8 shows a general computing device in the form of a computer 810, which may include network interface 801, a processing unit 802, memory 804, a bus 805, removable storage 812, and non-removable storage 814. The memory 804 may include volatile 806 and non-volatile memory 808. Computer 810 may include or have access to a computing environment that includes a variety of computer-readable media, such as volatile 806 and non-volatile memory 808, removable 812 and non-removable storage 814. Computer storage includes RAM, ROM, EPROM & EEPROM, flash memory or other memory technologies, CD ROM, Digital Versatile Disks (DVD) or other optical disk storage, magnetic cassettes, magnetic tape, magnetic disk storage or other magnetic storage devices, or any other medium capable of storing computer-readable instructions. Computer 810 may include, or have access to a computing environment that includes, input 816, output 818, and a communication connection 820. The computer may operate in a networked environment using a communication connection to connect to one or more remote computers. The remote computer may include a personal computer, server, router, network PC, a peer device or other common network node, or the like. The communication connection may include a Local Area Network (LAN), a Wide Area Network (WAN) or other networks.

Embodiments of the invention may be implemented in conjunction with program modules, including functions, procedures, data structures, application programs, etc., for performing tasks, or defining abstract data types or low-level hardware contexts. Program modules, such as data sampler 710, frequency drift estimator 720, phase drift estimator 730, analyzer 740, and synchronizing module 750 shown in FIGS. 6 and 7, may be implemented in memory 804 and associated storage media of the type(s) mentioned above.

Machine-readable instructions stored on any of the above-mentioned storage media are executable by the processing unit 802 of the computer 810. For example, a computer program 825 may comprise machine-readable instructions capable of performing clock correction according the present subject matter. In one embodiment, the computer program 825 may be included on a CD-ROM and loaded from the CD-ROM to a hard drive in non-volatile memory 808. The machine-readable instructions cause the computer 810 to off-load the received electronic packets to one of the available methods according to the teachings of the present subject matter.

CONCLUSION

The above-described invention provides an improved clock correction technique for a communication system. The proposed technique uses both frequency as well as phase drift estimates to correct a local transceiver clock to synchronize the local and remote transceiver clocks. To achieve this, a novel phase drift estimation method is used. The phase tracking, when employed in combination with the frequency tracking ensures that any error in frequency corrections does not accumulate over time and does not cause any degradation in system performance over time.

Also, as a result of using the phase tracking, any inherent errors present in clock correction will not be accumulated over time. For example, the exact quantum of correction applied to the local receiver clock, in absolute terms, is never known perfectly due to error in the local clock itself, and this could lead to error accumulation over time. The phase tracking scheme employed here works in conjunction with a block frequency tracking scheme. Both the frequency and phase drift estimators operate over the same block of DFT points obtained from the input pilot signal.

The frequency and phase drift estimates are combined to yield one single clock correction parameter, which could be converted to a suitable sampling clock frequency correction or a sampling clock phase correction, as the case may be. Thus, the clock correction method could be used with various clock correction schemes.

The various embodiments of the clock correction module and methods of synchronizing the local and remote transceiver clocks herein are applicable generally to any communication system, and the embodiments described herein are in no way meant to limit the applicability of the invention. In addition, the techniques of the various example embodiments are useful to the design of any hardware implementations of clock correction modules, software, firmware, and algorithms. The above description is intended to be illustrative, and not restrictive. Many other embodiments will be apparent to those skilled in the art. The scope of the invention should therefore be determined by the appended claims, along with the full scope of equivalents to which such claims are entitled.

What is claimed is:

1. A method for synchronizing a receiver clock with a transmitter clock in a communication system, during transmission of a data signal by a transmitter, comprising:
   obtaining estimates of frequency and phase drifts between the transmitter and receiver clocks; and
   synchronizing the receiver clock with the transmitter clock based on the estimated phase and frequency drifts;
   wherein synchronizing the receiver and transmitter clocks comprises:
      receiving an input pilot signal of a predetermined frequency and phase, by a receiver from the transmitter;
      estimating the frequency and phase drifts between the transmitter and the receiver clocks using the input pilot signal;
      computing a clock correction parameter based on the phase and frequency drifts;
      synchronizing the receiver clock with the transmitter clock based on the clock correction parameter;
      estimating a window length using the input pilot signal;
      forming a window using the window length for sampling the input pilot signal for estimating the frequency and phase drifts;
      estimating the frequency and phase drifts between the transmitter and the receiver clocks using the window;
      computing the clock correction parameter based on the phase and frequency drifts; and
      synchronizing the receiver and transmitter clocks based on the clock correction parameter.

2. The method of claim 1, further comprising:
   repeating the estimating, computing, and synchronizing steps for a next window.

3. The method of claim 1, wherein estimating the frequency drift comprises:
   determining a signal-to-noise ratio of the input pilot signal;
   estimating the window length based on the signal-to-noise ratio;
   forming the window using the window length; and
   estimating the frequency drift between the receiver and transmitter clocks using the data signal and the input pilot signal over the window.

4. The method of claim 3, wherein estimating the window length based on the signal-to-noise ratio comprises:
   receiving digital samples of the input pilot signal;
   outputting a predetermined number of pilot DFT points using the digital samples on a per-frame basis;
   estimating the signal-to-noise ratio using the predetermined number of pilot DFT points; and
   estimating the window length based on the signal-to-noise ratio.

5. The method of claim 4, wherein estimating the frequency drift comprises:
   computing a rate of drift of phase between successive pilot DFT points within the window, wherein the rate of drift of phase is computed by using angular differences between the successive pilot DFT points over the window;
   estimating the frequency drift by computing a weighted average of the computed rate of drifts within the window; and
   repeating the computing and estimating steps to estimate the frequency drift using a next window.

6. The method of claim 1, wherein estimating the phase drift comprises:
   estimating a reference phase;
   estimating the phase of the input pilot signal; and
   obtaining the phase drift by using the estimate of the phase of the input pilot signal and the estimated reference phase.

7. The method of claim 6, wherein synchronizing the receiver clock with the transmitter clock further comprises:
   synchronizing the receiver clock with the transmitter clock by correcting for the phase drift substantially after correcting for the frequency drift.

8. A method of synchronizing a local receiver clock in a local receiver with a remote transmitter clock in a remote transmitter, in a multi-carrier transmission system, comprising:
   obtaining estimates of frequency and phase drifts between the transmitter and receiver clocks; and
   synchronizing the local receiver clock with the remote transmitter clock based on the estimated frequency and phase drifts during transmission of a data signal by the remote transmitter;
   wherein synchronizing the receiver and transmitter clocks comprises:
      obtaining a window length from an experimental knowledge base;
      forming a window using the window length;
      estimating the frequency and phase drifts between the transmitter and the receiver clocks using an input pilot signal and the window;

computing a clock correction parameter based on the phase and frequency drift estimates;

synchronizing the receiver and transmitter based on the clock correction parameter; and repeating the estimating, computing and synchronizing steps for a next window.

9. The method of claim 8, wherein estimating the frequency drift comprises:

receiving digital samples of the input pilot signal, wherein the input pilot signal is of a predetermined frequency and signal phase, from the remote transmitter;

outputting a predetermined number of pilot DFT points using the digital samples on a window length basis;

computing angular differences in phase between successive pilot DFT points within the window; and estimating the frequency drift by computing a weighted average of the angular differences.

10. The method of claim 8, wherein estimating the phase drift comprises:

obtaining an estimate of the phase of the input pilot signal; and obtaining the phase drift by using the estimated phase of the input pilot signal and a predetermined reference phase.

11. The method of claim 8, wherein estimating the phase drift comprises:

obtaining an estimate of the phase of the input pilot signal from a first window;

using the obtained estimate of the phase of the input pilot signal as a reference phase;

obtaining an estimate of the phase of the input pilot signal from a next window; and obtaining the phase drift by using the estimated phase of the input pilot signal from the next window and the reference phase; and repeating the above steps to estimate the phase drift for a subsequent window.

12. A method, comprising:

obtaining estimates of frequency and phase drifts between a remote transmitter clock in a remote transmitter and a local receiver clock in a local receiver in a communication system; and synchronizing the local receiver and the remote transmitter clocks based on the estimated phase and frequency drifts;

wherein synchronizing the local receiver clock and the remote transmitter clock comprises:

receiving a pilot signal by the local receiver from the remote transmitter along with a data signal transmitted by the remote transmitter, wherein the pilot signal is of a predetermined frequency and signal phase;

estimating the phase and frequency drifts between the local receiver clock and the remote transmitter clock using the pilot signal;

computing a clock correction parameter based on the phase and frequency drift estimates;

synchronizing the remote transmitter clock and local receiver clock based on the clock correction parameter;

wherein estimating the frequency drift comprises:

(a) obtaining a window length using a prior knowledge base;

(b) forming a window using the window length;

(c) receiving digital samples of the data signal;

(d) outputting a predetermined number of pilot DFT points using the digital samples within the window;

(e) computing angular differences between successive pilot DFT points within the window;

(f) estimating the frequency drift by computing a weighted average of the angular differences within the window; and (g) repeating steps (a) through (f) to estimate the frequency drift for a subsequent window.

13. The method of claim 12, wherein estimating the phase drift comprises:

estimating a reference phase of the first window;

obtaining an estimate of the phase of the pilot signal of a next window; and obtaining the phase drift by using the phase of the pilot signal and the reference phase.

14. The method of claim 13, wherein estimating the reference phase comprises:

receiving the digital samples of the data signal;

outputting the pilot DFT points using the digital samples on a per-window basis, wherein each pilot DFT point includes a complex number; and computing an average of the complex numbers within the window to estimate the reference phase.

15. The method of claim 12, wherein estimating the phase drift comprises:

obtaining an estimate of the phase of the pilot signal; and obtaining the phase drift by using the estimated phase of the pilot signal and a predetermined reference phase.

16. The method of claim 15, wherein obtaining the estimate of the phase of the pilot signal comprises:

receiving the digital samples of the data signal;

outputting the pilot DFT points using the received digital samples on a per-window basis, wherein each pilot DFT point includes a complex number; and computing an average of the complex numbers of successive pilot DFT points within each window to estimate the phase of the pilot signal.

17. The method of claim 13, wherein estimating the phase drift comprises:

comparing the phase of the pilot signal with a reference phase to obtain a preliminary phase drift; and combining the preliminary phase drift with the frequency drift to obtain the phase drift.

18. A clock correction module in a local receiver to synchronize a local receiver clock, in the local receiver, with a remote transmitter clock, in a remote transmitter, in a multi-carrier communication system, while transmitting a data signal by the remote transmitter, comprising:

a data sampler to sample an input pilot signal of a predetermined carrier frequency and phase;

a frequency drift estimator, coupled to the data sampler, to receive the data signal along with the input pilot signal, and to estimate a frequency drift between the receiver and transmitter clocks using the input pilot signal;

a phase drift estimator, coupled to the data sampler and the frequency drift estimator, to receive the data signal along with the input pilot signal, and to estimate a phase drift between the receiver and transmitter clocks using the input pilot signal;

an analyzer, coupled to the frequency drift estimator and the phase drift estimator, to receive the estimated phase and frequency drifts, and to compute a clock correction parameter based on the received estimated phase and frequency drifts; and a synchronizing block, coupled to the analyzer, to receive the clock correction parameter, and to adjust the receiver clock to synchronize the receiver clock with the transmitter clock based on the clock correction parameter;

wherein the local receiver and the remote transmitter comprise a Digital-to-Analog Converter (DAC) and an Analog-to-Digital Converter (ADC), and wherein the clock correction module is configured to synchronize the local receiver ADC and DAC clocks with the remote transmitter ADC and DAC clocks using the clock correction parameter; and wherein the frequency drift estimator computes a signal-to-noise ratio of the received input pilot signal, wherein the frequency drift estimator estimates a window length based on the signal-to-noise ratio, and forms a window using the window length, and wherein the frequency drift estimator estimates the frequency drift between the transmitter and receiver clocks using the received data signal over the window length.

19. The clock correction module of claim 18, further comprising:
a DFT module, wherein the DFT module is coupled to the data sampler, wherein the DFT module receives digital time domain samples of the received input pilot signal and outputs a predetermined number of pilot DFT points using the digital time domain samples for each window, wherein the frequency drift estimator receives the predetermined number of pilot DFT points associated with each window and estimates the signal-to-noise ratio using the predetermined number of pilot DFT points.

20. The clock correction module of claim 19, wherein the frequency drift estimator computes angular differences in the signal phase between successive pilot DFT points within a first window, and wherein the frequency drift estimator estimates the frequency drift by computing a weighted average of the angular differences in the signal phase, wherein the local receiver clock is adjusted to the remote transmitter clock by using the estimated frequency drift.

21. The clock correction module of claim 20, wherein the frequency drift is computed over a second window and the local receiver clock is corrected using the estimated frequency drift during the second window, and wherein the phase drift estimator estimates a reference phase using the second window.

22. The clock correction module of claim 21, wherein the frequency drift is computed over a third window and the local receiver clock is corrected using the estimated frequency drift during the third window, wherein the phase drift estimator obtains an estimate of the sampled signal phase using a third window, wherein the phase drift estimator further obtains the phase drift by using the estimate of the sampled signal phase and the reference phase, and wherein the clock correction module obtains a clock correction parameter using the estimated phase and frequency drifts and applies the clock correction parameter to the local receiver clock to synchronize the local receiver clock with the remote transmitter clock.

23. An apparatus for synchronizing local and remote transceiver clock signals in a communicating system, comprising:
a data sampler to sample an input pilot signal along with a data signal, wherein the input pilot signal is of a predetermined carrier frequency and phase;
a frequency drift estimator, coupled to the data sampler, to receive the data signal and the input pilot signal, and to estimate a frequency drift between the local and remote transceiver clocks using the input pilot signal;
a phase drift estimator, coupled to the data sampler and the frequency drift estimator, to receive the data signal and the input pilot signal, and to estimate a phase drift between the local and remote transceiver clocks using the input pilot signal;
an analyzer, coupled to the frequency drift estimator and the phase drift estimator, to receive the estimated phase and frequency drifts, and to compute a clock correction parameter based on the received estimated phase and frequency drifts; and
a synchronizing block, coupled to the analyzer, to receive the clock correction parameter, and to adjust the local transceiver clock with respect to the input pilot signal, to synchronize the local transceiver clock to the remote transceiver clock, based on the clock correction parameter;

wherein the frequency drift estimator obtains a window length from an experimental knowledge base and forms a window using the window length, wherein the frequency drift estimator receives digital samples of the transmitted data signal, and wherein the frequency drift estimator outputs pilot DFT points using the digital samples on a per-window basis, wherein the frequency drift estimator computes angular differences in phase between successive pilot DFT points within the first window, and wherein the frequency drift estimator estimates the frequency drift by computing a weighted average of the angular differences.

24. The apparatus of claim 23, wherein the phase drift estimator obtains an estimate of the sampled signal phase in the second window, and wherein the phase drift estimator obtains the phase drift by using the estimated sampled signal phase and a predetermined reference phase.

25. The apparatus of claim 24, wherein the frequency drift estimator and the phase drift estimator estimate frequency drift and phase drift, respectively, for each window length, wherein the synchronizing block applies the clock correction parameter to synchronize the local and remote transceiver clocks during each associated window length.

26. An article comprising a computer-readable medium which stores computer-executable instructions, the instructions causing a computer to:
receive an input pilot signal, of a predetermined frequency, amplitude, and signal phase, by a local receiver clock from a remote transmitter;
estimate the frequency and phase drifts between a remote transmitter clock in the remote transmitter and the receiver clock using the input pilot signal;
compute a clock correction parameter based on the phase and frequency drift estimates;
synchronize the local receiver clock with the remote transmitter clock based on the clock correction parameter;
estimate a window length using the input pilot signal; and
repeat the estimate of the frequency and phase drifts, the computation of the clock correction parameter and the synchronization of the local receiver clock and the remote transmitter clock steps for the window length;
wherein the instructions to estimate the frequency drift further cause a computer to:
determine a signal-to-noise ratio of the input pilot signal;
estimate the window length based on the signal-to-noise ratio;
form a window using the estimated window length; and
estimate the frequency drift between the remote transmitter and local receiver clocks using a data signal and the input pilot signal over the window.

27. The article comprising the computer-readable medium which stores computer-executable instructions of claim 26, wherein the instructions to estimate the phase drift further cause a computer to:

estimate a reference phase;

estimate the phase of the input pilot signal; and obtain the phase drift by using the phase of the input pilot signal and the estimated reference phase.

28. A computer system for synchronizing clock signals in a communication system used in a multi-carrier system, comprising:

a bus;

a processor coupled to the bus;

a memory coupled to the processor;

a data sampler to sample an input pilot signal of a predetermined carrier frequency and phase;

a frequency drift estimator, coupled to the data sampler, to receive a data signal along with the input pilot signal, and to estimate a frequency drift between receiver and transmitter clocks using the input pilot signal;

a phase drift estimator, coupled to the data sampler and the frequency drift estimator, to receive the data signal along with the input pilot signal, and to estimate a phase drift between the receiver and transmitter clocks using the input pilot signal;

an analyzer, coupled to the frequency drift estimator and the phase drift estimator, to receive the estimated phase and frequency drifts, and to compute a clock correction parameter based on the received estimated phase and frequency drifts; and a synchronizing block, coupled to the analyzer, to receive the clock correction parameter, and to adjust the receiver clock to synchronize a receiver clock with a transmitter clock based on the clock correction parameter;

wherein the frequency drift estimator computes a signal-to-noise ratio of the received data signal, wherein the frequency drift estimator estimates a window length based on the signal-to-noise ratio, and forms a window using the window length, and wherein the frequency drift estimator estimates the frequency drift between the transmitter and receiver clocks using the received data signal over the window.

29. The system of claim 28, wherein the frequency drift estimator estimates the frequency drift during the first window and corrects the local receiver clock using the estimated frequency drift, wherein the frequency drift estimator estimates the frequency drift again during a second window and corrects the local receiver clock with the estimated frequency drift during the second window, wherein the phase drift estimator estimates a reference phase using the second window, wherein the phase drift estimator obtains an estimate of the sampled signal phase during the second window, and wherein the frequency drift estimator further computes the frequency drift during a third window, wherein the phase drift estimator obtains the phase drift by using the estimate of the sampled signal phase and the reference phase during the third window, and wherein the analyzer computes a clock correction parameter using the estimated frequency and phase drifts and corrects the local receiver clock using the clock correction parameter.

* * * * *